March 19, 1946.  I. PARSONS  2,396,928
BRANDING AND DEHORNING CHUTE
Filed Jan. 23, 1945   3 Sheets-Sheet 1
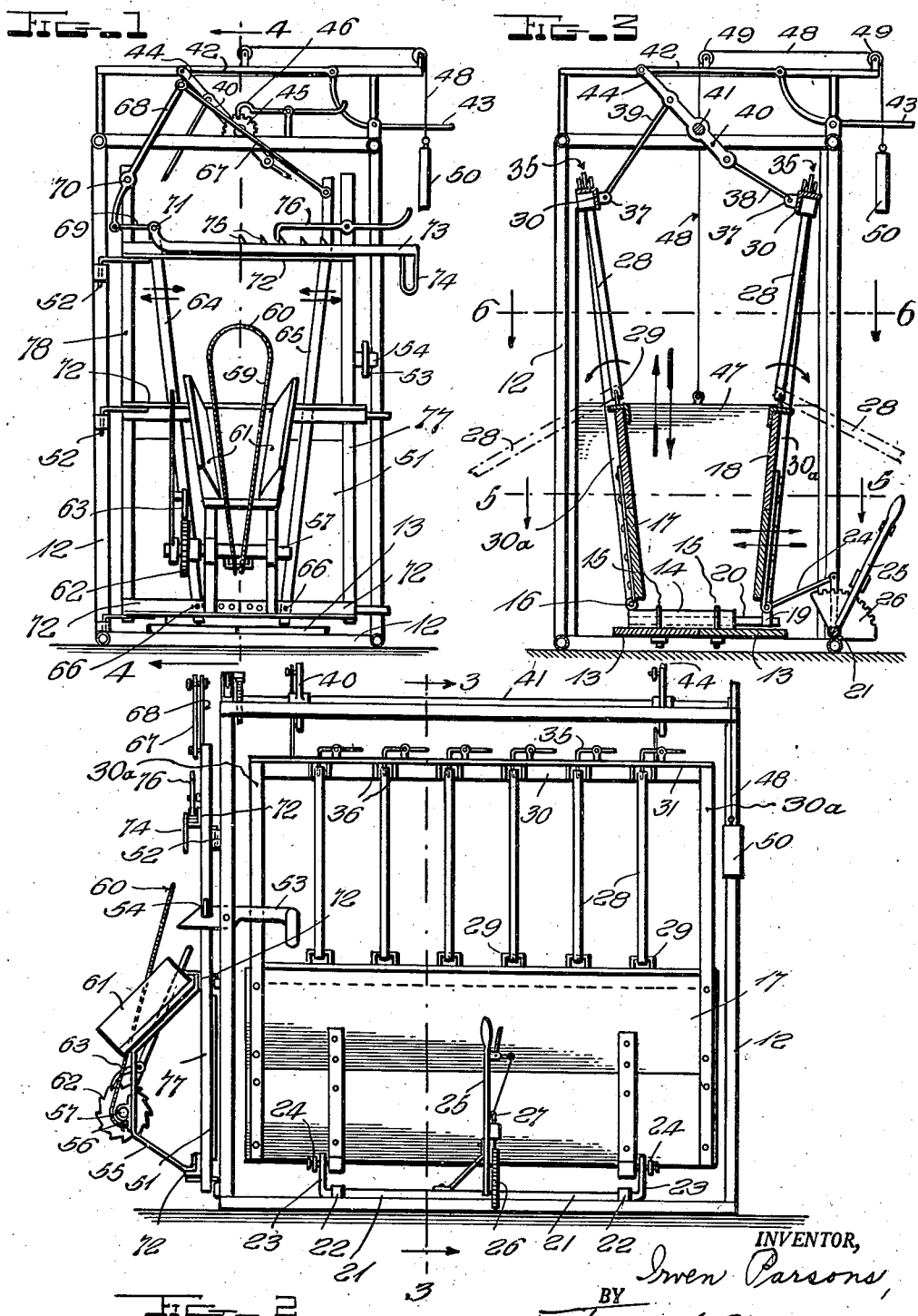

March 19, 1946. I. PARSONS 2,396,928
BRANDING AND DEHORNING CHUTE
Filed Jan. 23, 1945 3 Sheets-Sheet 2
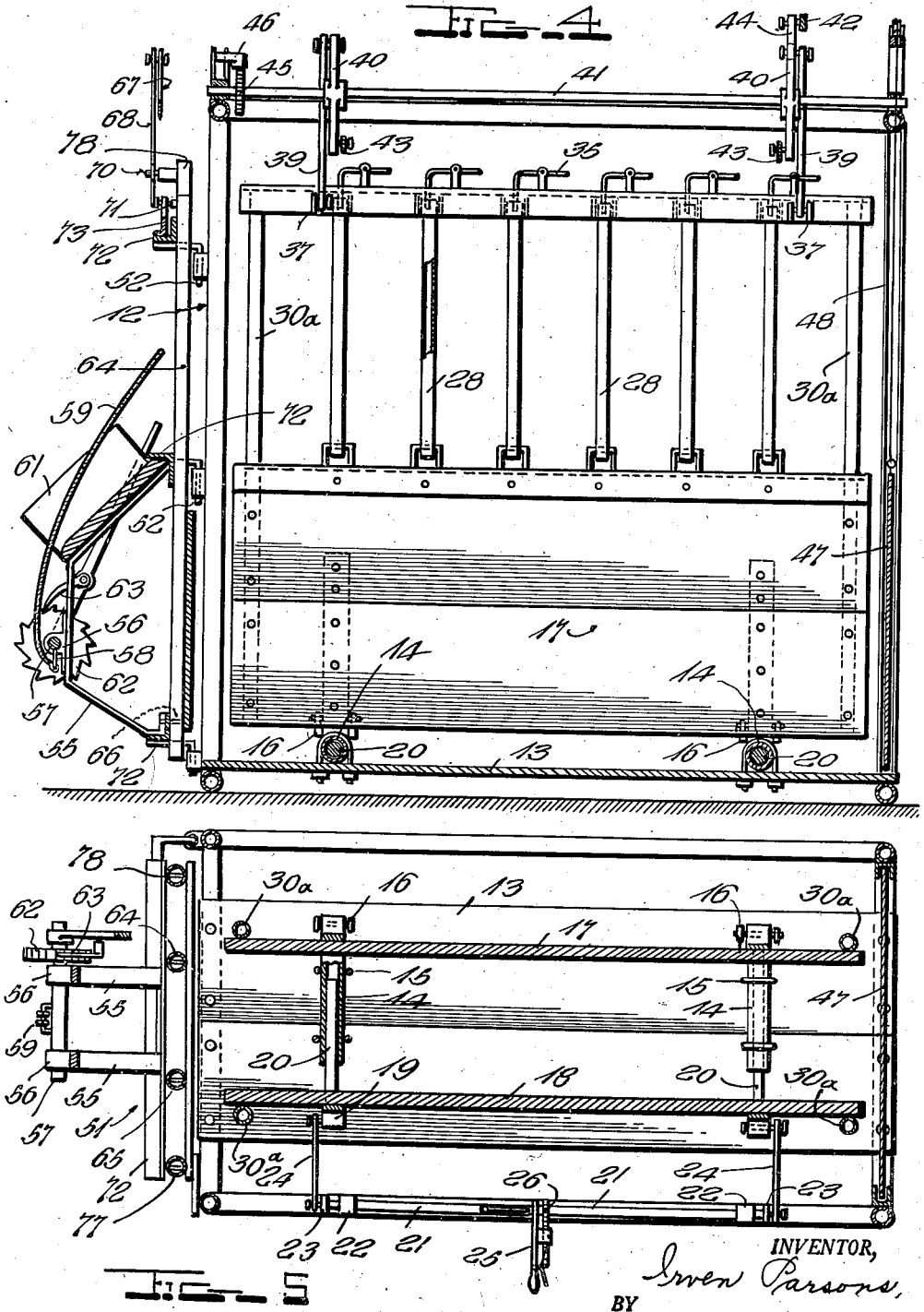
INVENTOR,
Irven Parsons,
BY
Frank S. Appleman,
ATTORNEY.

March 19, 1946.   I. PARSONS   2,396,928
BRANDING AND DEHORNING CHUTE
Filed Jan. 23, 1945   3 Sheets-Sheet 3
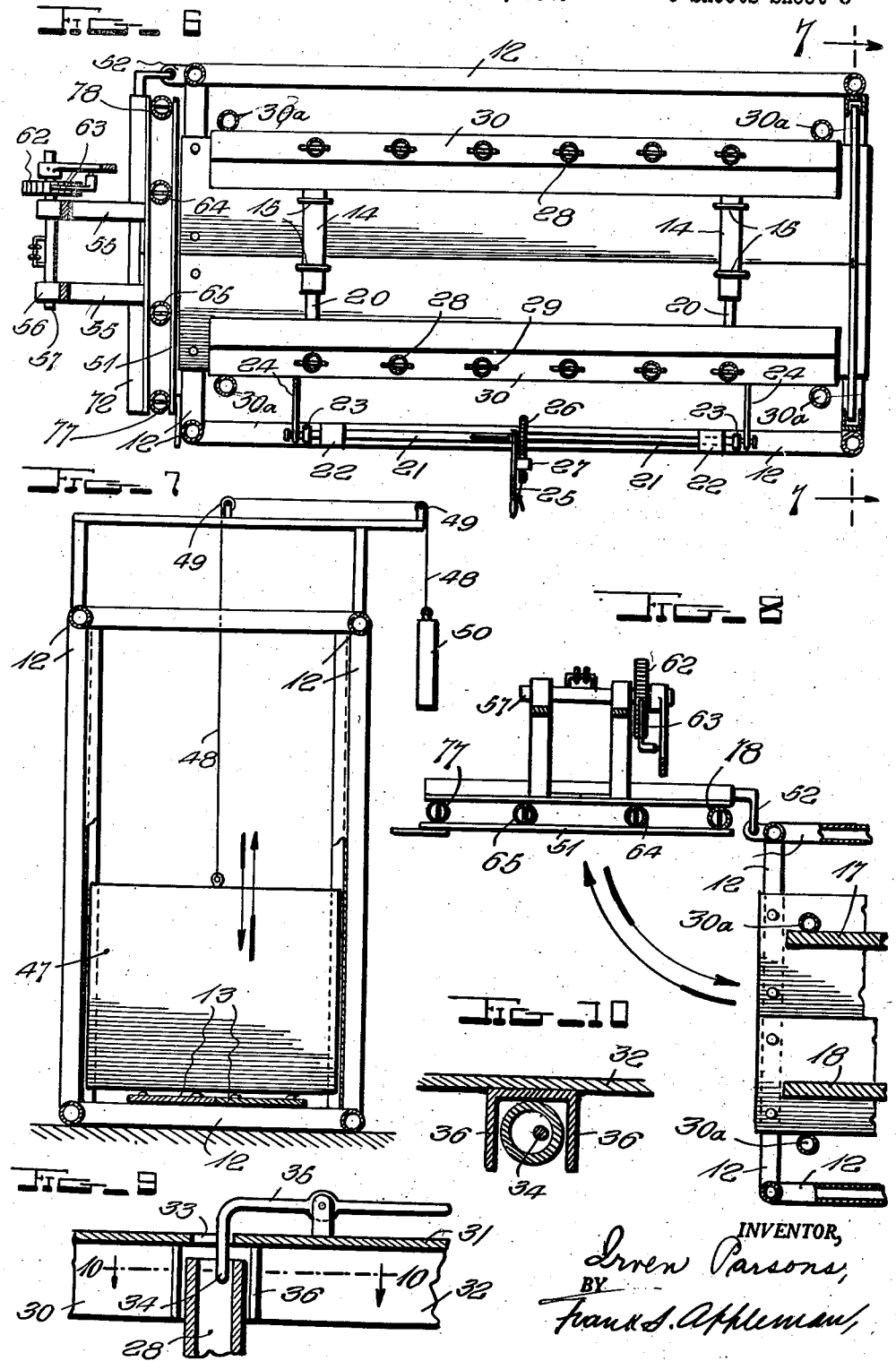

Patented Mar. 19, 1946

2,396,928

UNITED STATES PATENT OFFICE 2,396,928

BRANDING AND DEHORNING CHUTE

Irven Parsons, Bassett, Nebr.

Application January 23, 1945, Serial No. 574,143

6 Claims. (Cl. 119—99)

This invention relates to holders for cattle which are to be dehorned or otherwise treated when it is desirable to restrain the movement of the animal, and it is an object of the invention to provide what is sometimes known as a "squeeze gate" which prevents the subject from bodily movement, and the invention also includes means for drawing the head of the animal so that its lower jaw is in a trough-like support where it is held during the dehorning operation.

It is a further object of the invention to provide a pen or chute into which the animal is driven, the front of the pen being provided with a trough-like support for the head of the animal, a flexible member being also provided to be looped around the neck of the animal and operated so that it will draw the head of the animal downwardly with its jaw resting in the trough.

It is also an object to provide side enclosures which are adjustable, one from the other, laterally to increase or diminish the space to be occupied by the animal, and to associate therewith, squeezing means hingedly connected to the aforesaid members.

It is furthermore an object to provide operative means by which the sides are adjusted, and other operative means by which the squeezing instrumentalities are operated on their hinges or pivots to effectively confine the animal for the purpose indicated, and means are furthermore provided for temporarily retaining the operative parts in different positions of adjustment.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a view in front elevation of the animal holder;

Figure 2 illustrates a view in elevation, showing one of the sides;

Figure 3 illustrates a transverse sectional view on the line 3—3 of Fig. 2;

Figure 4 illustrates a longitudinal sectional view on the line 4—4 of Fig. 1;

Figure 5 illustrates a transverse sectional view of the device on the line 5—5 of Fig. 3;

Figure 6 illustrates a transverse sectional view of the device on the line 6—6 of Fig. 3;

Figure 7 illustrates a transverse sectional view of the device on the line 7—7 of Fig. 6;

Figure 8 illustrates a detail view showing the front gate swung out to release the animal;

Figure 9 illustrates a sectional view of the latch for holding a squeeze bar; and Figure 10 illustrates a sectional view on the line 10—10 of Fig. 9.

In these drawings 12 denotes several sections of a rectangular frame comprising base members, side members, vertically disposed members and horizontally disposed top members which may be formed of metal pipe, or the frame may be a wooden structure, but the inventor does not wish to be limited with respect to this feature. Suitable floor plankings 13 extend longitudinally of the frame, and transversely disposed tubes or metal pipes 14 are secured to the floor by clips, such as 15. The tube is therefore stationarily fixed on the floor, and the outer end of each tube is provided with a hinge 16, by which a solid side 17 of the holder is hinged to said tubes. A companion solid side 18 has its lower edge connected by suitable couplings 19 to rods, such as 20, each of which slides in one of the tubes which are anchored to the floor. Thus, the side 18 is movable with respect to the side 17 to increase or diminish the space between the solid sides of the device. A longitudinally extending crank shaft 21 is rotatably mounted in bearings, such as 22, or a stationary part of the structure, and the cranks 23 are each connected by a link 24 to the coupling 19 so that as the crank shaft is partially rotated, the cranks operate to move the side 18 inwardly or outwardly, according to the direction of rotation of the crank shaft, which crank shaft is manipulated by a handle 25 connected to the shaft and, as shown, there is a segmental rack 26, the teeth of which are engaged by a dog or detent 27 carried by the handle so that the crank shaft is held at different positions of adjustment.

In addition to the solid sides which aid in confining the animal, a plurality of tubular members, such as 28, are pivotally connected or hinged to the upper edges of the solid sides, as at 29. The tubular members of each side operate in conjunction with an angle iron 30, one flange 31 of which is approximately horizontal and the other flange 32 of which is substantially vertical. The flange 31 is provided with a plurality of apertures 33, through which the noses 34 of latches 35 extend, each said latch being pivoted on the upper surface of the flange 31, and the flange 32 is provided with spaced ribs 36, between which the upper ends of the tubular members are lodged and held when the latch is in operative position with relation to the tubes; it being understood that the latches may be manipulated to release the tubes which may swing to the dotted line position in which they are shown in Fig. 3. However, when the assembly is in operative position, the tubes have their upper ends lodged between the ribs and are held in that position by the latches. The angle iron 30 for each door is carried by two posts 30a attached at the ends of the door.

Suitably apertured ears 37 are carried by the flanges 32, and links 38 and 39 are pivoted to the ears 37 of the respective sides of the squeeze. The links have their inner ends pivotally connected to a cross arm 40 on opposite sides of a shaft 41 which is rotatably mounted on the frame. The cross arm has one of its ends connected to a link 42 and the said link is moved longitudinally by the lever 43 pivoted to the frame. The cross arm 44 on the shaft which is remote from the cross arm 40 is keyed to the shaft and is operated as the shaft is manipulated under the influence of the lever 43. The shaft 41 has a ratchet wheel 45 secured to it, and a dog 46 engages the ratchet wheel to retain the shaft in different positions of adjustment, and it is obvious that the shaft may be released so that the parts may be returned to their open positions for the reception of a succeeding subject.

The frame is provided with a door 47 which is preferably vertically slidable in the frame and may be manipulated by the flexible element 48 operating over pulleys 49, and the door may be held open by a weight 50 until the animal has entered, and it may then be held closed by any suitable means.

The front of the pen comprises a door 51 hinged to the frame, as at 52, so that it may be opened and closed as is illustrated in Figure 8 where it is shown in an open position, and when it is closed, it has the position in which it is shown in Figure 6 and elsewhere. The front or egress door or closure is held closed by a latch 53 pivoted to the frame and engaging a lug 54 on the door. The frame of the front door has two brackets 55 anchored to it, and the brackets have bearings 56 for the shaft 57 of a windlass 58 on which the ends of a flexible member 59 are wound, the said flexible member being looped, as at 60, to embrace the neck of the animal which is driven into the holder, and the frame of the front door is also provided with diverging trough-like members 61 between which the jaw of the animal is drawn as the flexible member is wound on the drum of the windlass. The shaft 57 has a ratchet wheel 62 secured on it and a handle having a ratchet 63 coacting with the ratchet wheel is oscillatably mounted on the shaft so that as the handle is moved back and forth, it will serve to rotate the ratchet wheel and the windlass for operating the flexible member 59.

For the purpose of pressing the neck of the animal from two sides, a yoke comprising two bars 64 and 65, each has its lower ends pivoted, as at 66, and these yoke members are moved toward and away from each other by a link assembly comprising the members 67, 68 and 69. The members 67 and 68 have their contiguous ends pivoted together, and the member 68 is mounted on a pivot 70. The end of the yoke member 64 has a pivot 71 to which one end of the link member 69 is connected, and the said link member 69 has its opposite end pivoted to the link member 68.

The frame of the door includes upper, lower and intermediate angle irons 72, and an operating bar 73 is slidable on the upper angle iron and it carries the pivot 71 to which the link 69 is connected. The bar has a handle 74 for manipulation and it also has a plurality of teeth 75 which may be engaged by a dog 76 by which the bar is held at different positions of adjustment. When the bar 73 is moved back and forth, it serves to move the yoke 64 and through the linkage described, the yoke 65, so that the yoke members may be drawn into engagement with the neck of the animal occupying the holder.

The angle irons which are part of the door 51 are attached to vertically disposed members 77 and 78, on which latter member the link 68 is pivoted.

As the structural features and functions of the different parts of the animal holder have been stated in connection with a description of the parts, it is believed unnecessary for an understanding of one skilled in the art to supply a résumé of the said operation.

I claim:

1. A cattle holder comprising an enclosure with an ingress door at one end, an egress door at the other end, a squeeze gate within the enclosure having two sides, one of which is approximately stationary and the other of which is movable toward and away from the approximately stationary side, including means for adjusting the movable side, tubular bars oscillatively mounted in the upper edges of each of the said sides, angle irons suspended above the tubular bars and engaged by said bars, latches on the angle irons for entering the tubes to hold them assembled with relation to the angle irons, means for moving the angle irons toward and away from each other for the purpose of squeezing and releasing the animal, means for retaining the moving means at different positions of adjustment, a neck yoke pivotally mounted on the egress door, means for operating the yoke for clamping or releasing the neck of an animal, a support for the jaw of an animal carried by the said egress door, and means for embracing the head of an animal and operative to pull the head downwardly with the jaw of the animal in said support.

2. In a holder for animals, an enclosure into which the animal is driven, a floor on which the animal is supported in the enclosure, tubular members extending transversely of the floor, clamps engaging the tubular members for holding them in stationary position, rods slidable in the said tubular members, a side wall secured to the outer ends of the tubular members, a movable side wall spaced from the first mentioned side wall connected to the rods, means for moving the rods to which the side wall is attached longitudinally of the tubular members, and means for retaining said means in adjusted positions.

3. In a holder for animals, an enclosure into which the animal is driven, a floor on which the animal is supported in the enclosure, tubular members extending transversely of the floor, clamps engaging the tubular members for holding them in stationary position, rods slidable in the said tubular members, a side wall secured to the outer ends of the tubular members, a movable side wall spaced from the first mentioned side wall connected to the rods, a crank shaft mounted in operative relation to the movable side wall, connections from the crank shaft to the rods, means for holding the crank shaft at different positions of adjustment, rods oscillatively mounted on the upper edges of the side walls, a member above each of the side walls with which the rods coact, means on the members for removably holding the rods stationary with relation to said members, means for moving the members toward and away from each other whereby the sides including the said rods are forced into engagement and released from an animal between the side walls, an ingress and an egress door at respective ends of the enclosure, means on the egress door for supporting the head of an animal occupying the enclosure, and means for pulling the head of the animal against said support.

4. In a holder for animals, an enclosure into which the animal is driven, a floor on which the animal is supported in the enclosure, tubular members extending transversely of the floor, clamps engaging the tubular members for holding them in stationary position, rods slidable in the said tubular members, a side wall secured to the outer ends of the tubular members, a movable side wall spaced from the first mentioned side wall connected to the rods, a crank shaft mounted in operative relation to the movable side wall, connections from the crank shaft to the rods, means for holding the crank shaft at different positions of adjustment, rods oscillatively mounted on the upper edges of the side walls, a member above each of the side walls with which the rods coact, means on the members for removably holding the rods stationary with relation to said members, means for moving the members toward and away from each other whereby the sides including the said rods are forced into engagement and released from an animal between the side walls, an ingress and an egress door at respective ends of the enclosure, means on the egress door for supporting the head of an animal occupying the enclosure, means for pulling the head of the animal against said support, yoke members oscillatively mounted in spaced relation to each other on the egress door, means for moving the said yoke members toward and away from each other, and means for holding the operating means in different positions of adjustment.

5. A cattle holder comprising an enclosure with an ingress door at one end, an egress door at the other end, a squeeze gate within the enclosure having two sides, one of which is approximately stationary and the other of which is movable toward and away from the approximately stationary side, including means for adjusting the movable side, tubular bars oscillatively mounted in the upper edges of each of the said sides, angle irons suspended above the tubular bars and engaged by said bars, latches on the angle irons for entering the tubes to hold them assembled with relation to the angle irons, means for moving the angle irons toward and away from each other for the purpose of squeezing and releasing the animal, said means comprising a shaft rotatably mounted on the enclosure, cross arms on the shaft, means connected to one of the cross arms for imparting rotary motion to the shaft, links connecting opposite ends of the cross arms to the respective angle irons, means for retaining the moving means at different positions of adjustment, a neck yoke pivotally mounted on the egress door, means for operating the yoke for clamping or releasing the neck of an animal, a support for the jaw of an animal carried by the said egress door, and means for embracing the head of an animal and operative to pull the head downwardly with the jaw of the animal in said support.

6. In a holder for animals, an enclosure into which the animal is driven, a floor on which the animal is supported in the enclosure, tubular members extending transversely of the floor, clamps engaging the tubular members for holding them in stationary position, rods slidable in the said tubular members, a side wall secured to the outer ends of the tubular members, a movable side wall spaced from the first mentioned side wall connected to the rods, a crank shaft mounted in operative relation to the movable side wall, connections from the crank shaft to the rods, means for holding the crank shaft at different positions of adjustment, rods oscillatably mounted on the upper edges of the side walls, a member above each of the side walls with which the rods coact, means on the members for removably holding the rods stationary with relation to said members, means for moving the members toward and away from each other whereby the sides including the said rods are forced into engagement and released from an animal between the side walls, an ingress and an egress door at respective ends of the enclosure, means on the egress door for supporting the head of an animal occupying the enclosure, means for pulling the head of the animal against said support, said means for pulling the head of the animal comprising a suitably operated windlass, a flexible member having its ends anchored to the windlass and looped between its ends for embracing the neck of the animal back of the head, yoke members oscillatively mounted in spaced relation to each other on the egress door, means for moving the said yoke members toward and away from each other, and means for holding the operating means in different positions of adjustment.

IRVEN PARSONS.